United States Patent
Lee et al.

(10) Patent No.: US 11,128,921 B2
(45) Date of Patent: *Sep. 21, 2021

(54) SYSTEMS AND METHODS FOR CREATING AN ASYNCHRONOUS SOCIAL WATCHING EXPERIENCE AMONG USERS

(71) Applicant: Rovi Guides, Inc., San Jose, CA (US)

(72) Inventors: Richard Daniel Lee, San Francisco, CA (US); Ida Wahlquist-Ortiz, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/507,420

(22) Filed: Jul. 10, 2019

(65) Prior Publication Data

US 2019/0373328 A1 Dec. 5, 2019

Related U.S. Application Data

(63) Continuation of application No. 15/992,967, filed on May 30, 2018, now Pat. No. 10,390,097.

(51) Int. Cl.
*H04N 21/4788* (2011.01)
*H04N 21/475* (2011.01)
(Continued)

(52) U.S. Cl.
CPC ......... *H04N 21/4788* (2013.01); *G06Q 50/01* (2013.01); *H04N 21/4126* (2013.01); *H04N 21/42203* (2013.01); *H04N 21/4756* (2013.01); *H04N 21/4758* (2013.01); *H04N 21/4882* (2013.01); *H04N 21/8106* (2013.01); *H04N 21/8133* (2013.01)

(58) Field of Classification Search
None
See application file for complete search history.

(56) References Cited

U.S. PATENT DOCUMENTS

| 6,546,405 B2 * | 4/2003 | Gupta | G06F 16/78 715/233 |
| 7,735,101 B2 * | 6/2010 | Lanza | H04N 21/4756 725/32 |

(Continued)

*Primary Examiner* — Alexander Q Huerta
(74) *Attorney, Agent, or Firm* — Haley Guiliano LLP

(57) ABSTRACT

Systems and methods are disclosed herein for creating a co-watching experience among audience members who are physically apart when watching the media asset. A media guidance application may monitor a sound of the first user. In response to the sound being detected during the monitoring, the media guidance application may determine whether the first user emitted the sound based on an occurrence in the video. In response to determining that the first user emitted the sound based on an occurrence in the video, the media guidance application may store the sound in connection with a timecode of the video corresponding to a time when the sound is detected. When the video is displayed to a second user, the sound of the first user may be played back based on the timecode of the video stored in connection with the sound. In this way, even if users are physically apart, or may watch a media asset at separate times, by sharing and playing back recorded vocal expression of a user, other users may perceive the vocal expression of the user to create a co-watching experience.

18 Claims, 10 Drawing Sheets

(51) Int. Cl.
*G06Q 50/00* (2012.01)
*H04N 21/488* (2011.01)
*H04N 21/41* (2011.01)
*H04N 21/81* (2011.01)
*H04N 21/422* (2011.01)

(56) References Cited

U.S. PATENT DOCUMENTS

| | | | | |
|---|---|---|---|---|
| 7,739,584 | B2* | 6/2010 | Vella | H04N 9/3105 |
| | | | | 715/203 |
| 2004/0117822 | A1* | 6/2004 | Karaoguz | H04L 29/06027 |
| | | | | 725/37 |
| 2005/0210393 | A1* | 9/2005 | Maeng | G06Q 10/10 |
| | | | | 715/751 |
| 2009/0183220 | A1* | 7/2009 | Amento | H04N 21/26258 |
| | | | | 725/120 |
| 2011/0246937 | A1* | 10/2011 | Roberts | G11B 27/34 |
| | | | | 715/810 |
| 2013/0346330 | A1* | 12/2013 | Fleischman | G06Q 50/01 |
| | | | | 705/319 |
| 2013/0346867 | A1* | 12/2013 | Woods | G11B 27/34 |
| | | | | 715/728 |
| 2015/0149473 | A1* | 5/2015 | Wheatley | G06F 16/41 |
| | | | | 707/741 |
| 2016/0361646 | A1* | 12/2016 | Perry | A63F 13/497 |
| 2017/0076740 | A1* | 3/2017 | Feast | G06F 17/00 |

* cited by examiner

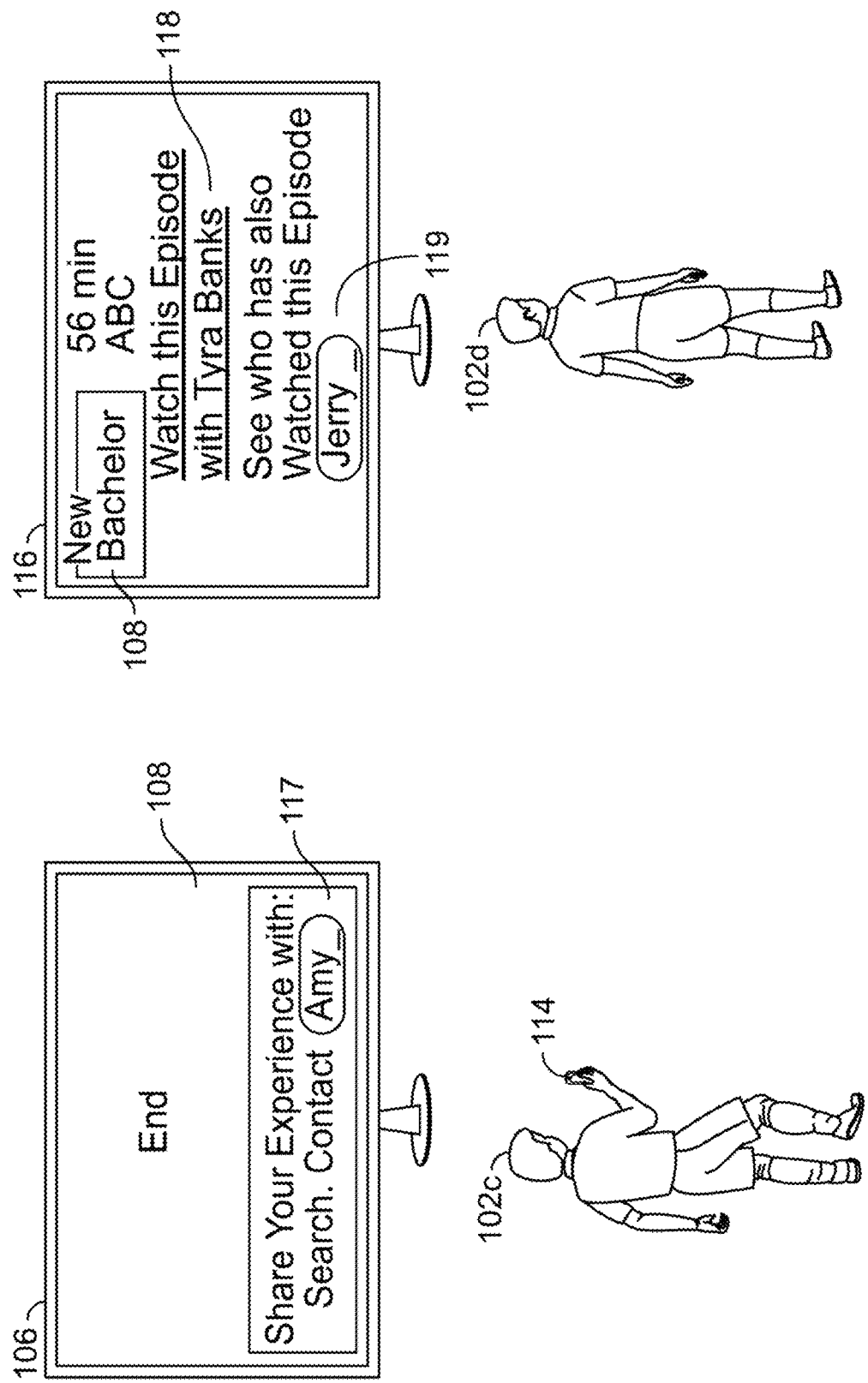

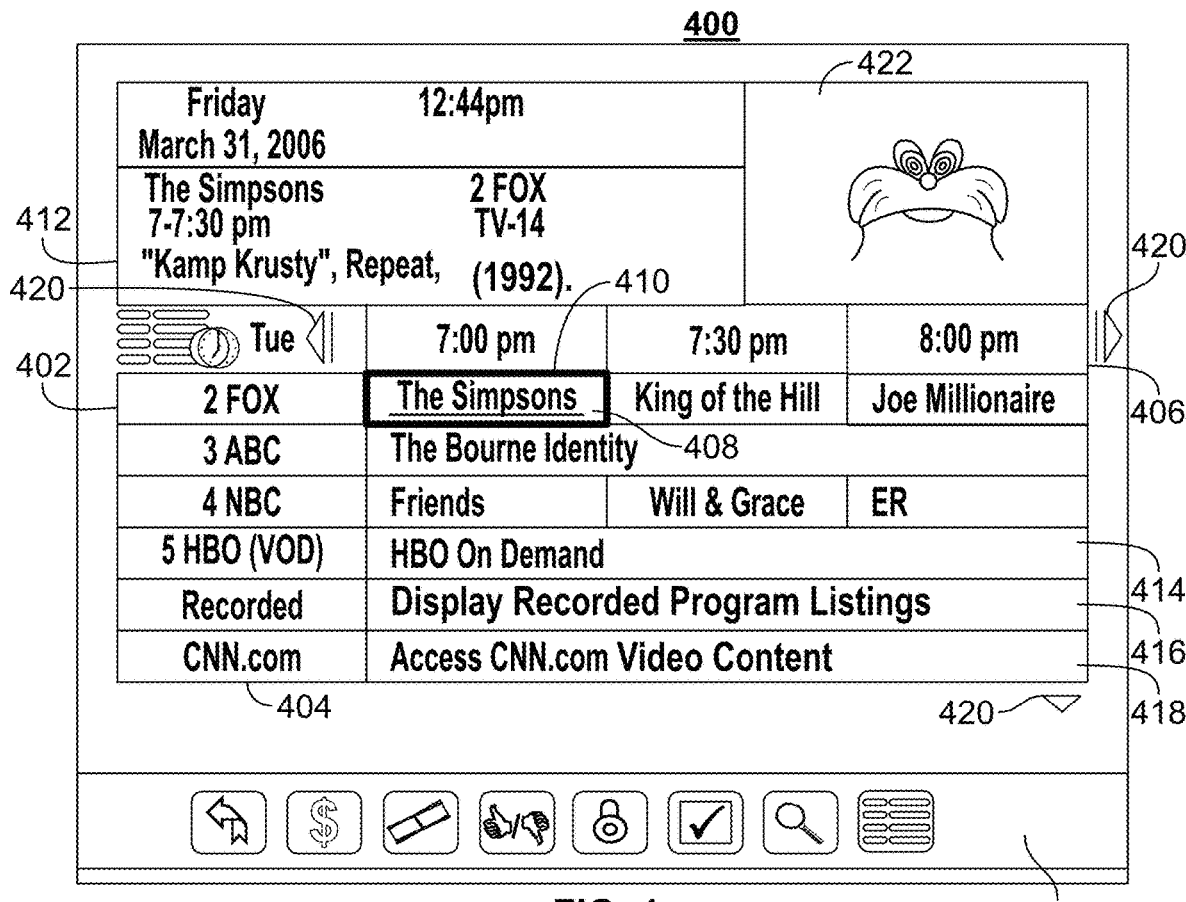

SYSTEMS AND METHODS FOR CREATING AN ASYNCHRONOUS SOCIAL WATCHING EXPERIENCE AMONG USERS

CROSS REFERENCE TO RELATED APPLICATION

This application is a continuation of U.S. patent application Ser. No. 15/992,967, filed May 30, 2018, currently allowed, which is hereby incorporated by reference herein in its entirety.

BACKGROUND

Users may enjoy the experience of watching media in a group, particularly in seeing the reactions of friends to the shows they are all interested in watching. However, coordinating with friends to watch the same show at the same time at the same place is difficult, as multiple users may not be available to watch the show at the same time. Some existing media systems may help people who are physically apart share a viewing experience of a media asset by sharing user comments (e.g., textual comments) of the media asset. Conventionally, some media systems may aggregate textual comments from audience users who watch the same media asset, and display the aggregated comments to each user so that each respective user may see what other users commented about a specific occurrence in the media asset. For example, some media systems may overlay textual comments as ticker banners overlaying the display screen while the media asset is being played. The aggregated ticker comments, however, can sometimes obstruct visibility of the display of the media asset. And when there are a lot of comments from other users, and not every comment is of a particular user's interest, the volume of comments may disrupt the user's viewing experience. In addition, a ticker comment shown on the display screen provides very limited sharing and social watching experience to users. For example, when family members are physically apart, but would like to watch a sports game together, each family member would have to manually input textual comments for other family members to see the comment. The social watching experience through sharing comment overlay is quite limited.

SUMMARY

Systems and methods are disclosed herein for storing a user vocal comment relating to a media asset for augmenting playback of the media asset to another user to create a social viewing experience of the media asset when creating a co-watching experience for users even when the users are physically apart or watch the media asset at separate times. By capturing and sharing user reactions such as vocal expression made by a first user in response to content of the media asset with another user, the other user may perceive the user reaction in a simulated way that resembles a co-watching experience with the first user.

Specifically, a media guidance application may monitor a sound of the first user. In response to the sound being detected during the monitoring, the media guidance application may determine whether the first user emitted the sound based on an occurrence in the video. In response to determining that the first user emitted the sound based on an occurrence in the video, the media guidance application may store the sound in connection with a timecode of the video corresponding to a time when the sound is detected. When the video is displayed to a second user, the sound of the first user may be played back based on the timecode of the video stored in connection with the sound. In this way, even if users are physically apart, or may watch a media asset at separate times, by sharing and playing back recorded vocal expression of a user, other users may perceive the vocal expression of the user to create a co-watching experience.

The media guidance application may capture, via audio capturing circuitry, when the media asset is being played at a first playback position, an audio recording of ambient sound from an environment at which a first user is present. For example, the media guidance application may periodically, intermittently or constantly record ambient background noise of the room where the user is present. The media guidance application may then determine whether the audio recording of ambient sound includes a vocal expression, and may extract a set of mono signals from the audio recording, e.g., by converting a plurality of audio signals from the audio recordings to the frequency domain via Fourier transform, and identifying mono signals among the frequency domain representation.

In response to determining that the audio recording of ambient sound includes the vocal expression from at least one user from the users present, the media guidance application may determine a playback position corresponding to a time when the vocal expression is captured, and then retrieve a segment of the media asset prior to the playback position, e.g., a segment of a pre-defined length (5 seconds, 10 seconds, etc.). The media guidance application may then retrieve metadata corresponding to the segment of the media asset.

In some embodiments, the media guidance application may determine whether the vocal expression includes one or more identifiable keywords, and then calculate a difference metric of the variation pattern indicative of a degree of difference among the sequence of syllables, and determine whether the difference metric is greater than a pre-defined difference threshold. The media guidance application may retrieve metadata corresponding to a segment of the media asset that is immediately before the playback position of the media asset, and compare the retrieved metadata with the one or more keywords. The media guidance application may then determine, based on the comparing, that the vocal expression is related to an occurrence during the segment of the media asset.

In some embodiments, the media guidance application may utilize a data graph to build the logic relationship between the metadata and the vocal expression. Specifically, the media guidance application may identify one or more terms from the retrieved metadata corresponding to the segment of the media asset that is immediately before the first playback position of the media asset. The media guidance application may then retrieve a data graph representing a logic relationship between content terms relating to the media asset. The media guidance application may determine, from the data graph, a first node representing at least one of the one or more keywords from the vocal expression. The media guidance application may then determine, from the data graph, a second node representing at least one of the identified one or more terms from the retrieved metadata. The media guidance application may then determine, based on the data graph, a connection between the first node and the second node, e.g., a path comprising several edges between the terms on the graph. In response to determining that the length of the connection between the first node and the second node is shorter than a pre-defined distance, e.g., indicating that the two terms are sufficiently close to form a possible causal relationship, the media guidance application may determine that the vocal expression is related to the at least one term representing an occurrence during the segment of the media asset.

In some embodiments, the media guidance application may determine, based on characteristics of the connection between the first node and the second node, a type of a relationship between at least one of the one or more keywords from the vocal expression and at least one of the identified one or more terms from the retrieved metadata. For example, the data graph may specify a relationship represented by an edge, based on which the media guidance application may determine a causal relationship. For another example, the media guidance application may determine the type of relationship based on a length of the distance between two nodes, e.g., when the distance is shorter than a pre-defined threshold, the two nodes may represent a causal relationship.

In some embodiments, in response to determining that the type of the relationship is a causal relationship, the media guidance application may assign a relatively higher priority score to the at least one keyword. For another example, in response to determining that the type of the relationship is a non-causal relationship, the media guidance application may assign a relatively lower priority score to the at least one keyword. The media guidance application may transmit, to a server, the vocal expression in connection with an assigned priority score and the playback position of the media asset.

In some embodiments, the media guidance application may exclude user reactions that may not respond to the media asset watching, e.g., when the user is distracted by reading emails, playing video games on the user device, etc. Specifically, the media guidance application may monitor user activity during a time period corresponding to the segment of the media asset, e.g., to determine whether the user is paying attention to the media asset, or is distracted by other activities. The media guidance application may capture, via monitoring circuitry user physiological data corresponding to the time period when the segment of the media asset is played. For example, the media guidance application may record a video from the scene where the user is present to capture user activities, or an audio recording from the environment to capture ambient noise indicative of user activities.

In some embodiments, the media guidance application may also retrieve user application history corresponding to user device activities during the time period when the segment of the media asset is played. Specifically, the media guidance application may determine whether the vocal expression is caused by an event associated with the first user from the user physiological data and the user application history. In response to determining that the vocal expression is caused by the event associated with the first user from the user physiological data and the user application history, the media guidance application may refrain from storing the vocal expression.

In response to determining that the vocal expression is related to the occurrence during the segment of the media asset, the media guidance application may store the vocal expression in connection with the first playback position of the media asset. In some embodiments, prior to playback the recorded vocal expression to another user when the media asset is played at a later time to the other user, the media guidance application may determine whether to share the vocal expression with another user per privacy setting. Specifically, the media guidance application may receive an indication that the media asset is being played to another user. The media guidance application may then query a user database for a user profile corresponding to the other user, based on which the media guidance application may determine a connection between users, e.g., whether the noted users are socially connected. The media guidance application may then retrieve a privacy setting profile corresponding to the first user, and determine whether the other user is an authorized user to share the vocal expressions recorded and stored from the first user based on the social connection and the privacy setting profile.

In some embodiments, the media guidance application may receive at the same user equipment at a second time, a request from the second user to playback the media asset. The media guidance application may then generate for display, at first user equipment and at the second time, the media asset to the second user, and retrieve, from a local database, the stored vocal expression corresponding to the first playback position when the vocal expression is recorded. The media guidance application may then generate for audio playback the stored vocal expression at the first playback position of the media asset.

In some embodiments, the media guidance application may share the vocal expression with a cloud server such that different users, different devices, different user equipment and/or different media guidance applications implemented at different set-top boxes at different households may retrieve and playback the stored vocal expressions. For example, in response to generating for display, at first user equipment and at the second time, the media asset to the second user, the media guidance application may transmit, to a server, a query including a media asset title of the media asset for vocal expressions relating to the media asset from other users. In response to the query, the media guidance application may receive, from the server, a plurality of vocal expressions relating to the media asset, and each vocal expression corresponds to a respective user identifier and a respective playback position when the respective vocal expression was recorded.

In some embodiments, the media guidance application may filter vocal expressions that are stored with the media asset and only play a subset of more relevant vocal expressions to avoid adding too many audio annotations to the media asset playback. The media guidance application may selectively playback a subset of the available vocal expressions to avoid the audio playback of the vocal expressions is overly crowded (e.g., vocal expressions that are too close in time, etc.) and disrupts the user viewing experience. Specifically, the media guidance application may retrieve a first vocal expression corresponding to the first playback position and retrieving a second vocal expression corresponding to the second playback position, and determine whether an amount of time between the first playback position and the second playback position is smaller than a threshold, e.g., five seconds, etc. In response to determining that the amount of time between the first playback position and the second playback position is smaller than the threshold, the media guidance application may select one of the first vocal expression and the second vocal expression that has a higher priority score.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an example block diagram illustrating sharing recorded vocal expressions captured from a user, within embodiments described herein;

FIG. 3 provides an example block diagram illustrating recommending viewing experience from other users when a user selects to play back a media asset, within embodiments described herein;

FIG. 4 shows an illustrative embodiment of a display screen that may be used to provide media guidance application listings and other media guidance information, in accordance with some embodiments of the disclosure;

FIG. 5 shows another illustrative embodiment of a display screen that may be used to provide media guidance application listings, in accordance with some embodiments of the disclosure;

DETAILED DESCRIPTION

Figure 1:
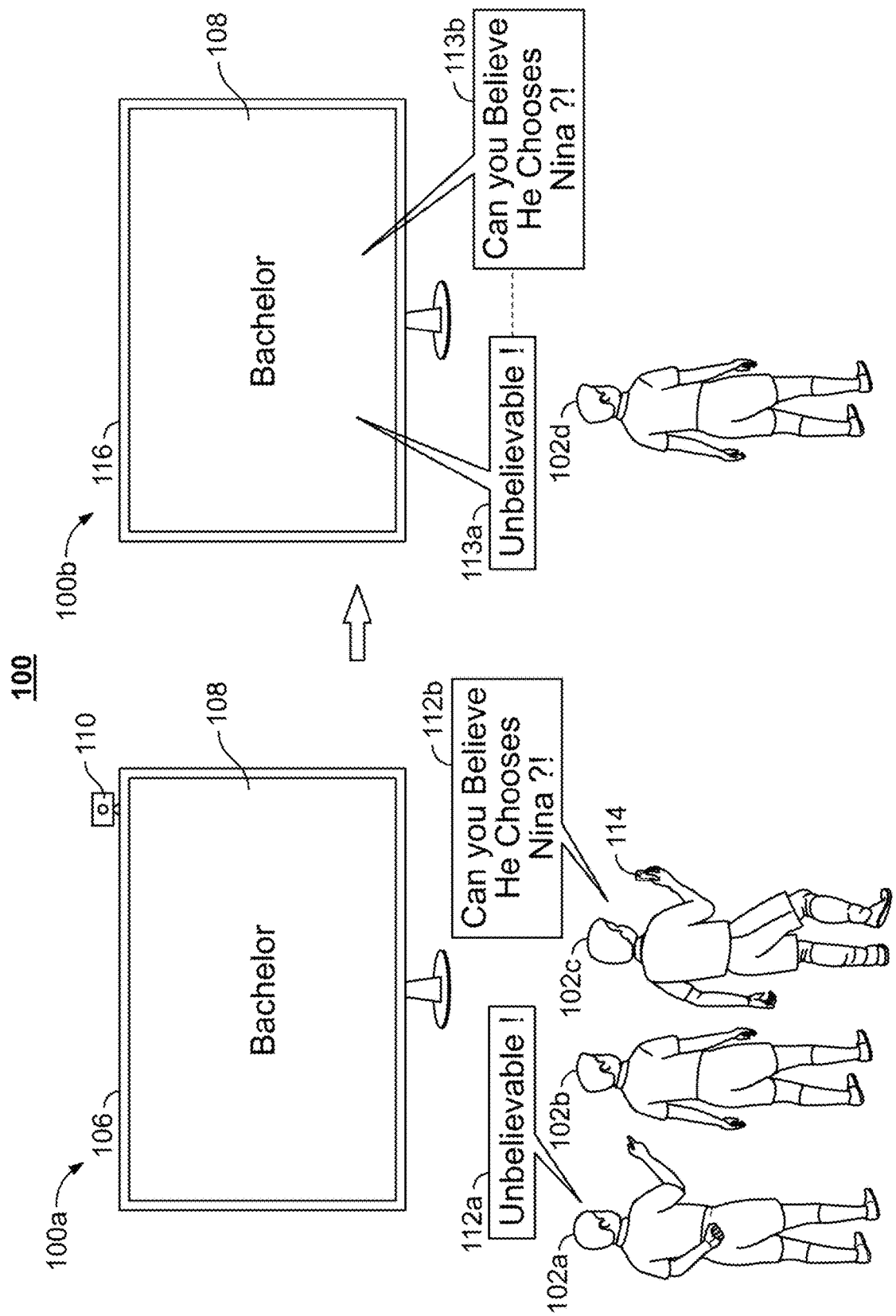
FIG. 1 depicts an illustrative example diagram 100 for storing a user vocal comment relating to a media asset for augmenting playback of the media asset to another user to create a social viewing experience of the media asset, in accordance with some embodiments of the disclosure.

Systems and methods are disclosed herein for storing a user vocal comment relating to a media asset for augmenting playback of the media asset to another user to create a social viewing experience of the media asset. Specifically, a media guidance application, which is implemented at a set-top box of user equipment, may be used to engage an audio capturing device (e.g., a microphone, etc.) to capture an audio recording from the environment where the user is present. The media guidance application may detect a vocal expression provided by a user from the audio recording, e.g., when the user makes a comment about the media asset that the user is watching, or gasps in response to an occurrence during a live sports event, etc. The media guidance application may then record the vocal expression to playback when the media asset is played back to another user so as to create a co-watching experience between the user and the other user.

In some embodiments, the media guidance application may record reactions of friends, e.g., vocal expressions, while watching the show at a different time or place from when the reaction was recorded. The media guidance application may identify social groups or connected friends of a user, e.g., based on a user's social profile. When a friend of the user is watching a show, the viewer is interested in, the media asset application may record audio, video, and/or sensory data of the friend watching the show. When the friend reacts to the content of the show, the media asset application may capture the reaction and information about the timing of the reaction in relation to the content of the show (e.g., a playback position of the media asset). When the user is watching the same show, e.g., either at a different time, or at the same time with the user's friend but at a different location, the media guidance application may cause the playback of the friend's reactions, e.g., a recorded vocal expression of the friend, to the user at the corresponding playback position of the media asset so that the user can have a co-watching experience with the user's friend.

As referred to herein, the term "vocal expression" refers to an expression, a sound, a statement and/or the like uttered by a human user. For example, the vocal expression is audibly detectable and recordable as an audio file. Within embodiments described herein, vocal expressions from users are recorded and played back to other users to create a co-watching experience. However, user reactions such as user movement, user biometrics data, and/or other forms of user reactions may be recorded in the form of a video file, and/or the like, and may be played back to other users to create a co-watching experience in an analogous manner as the playback of the vocal expression according to embodiments described herein.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for storing a user vocal comment relating to a media asset for augmenting playback of the media asset to another user to create a social viewing experience of the media asset, in accordance with some embodiments of the disclosure. Diagram 100 shows two scenes 100a and 100b. Scene 100a includes user equipment 106 that may include a step-top box, on which the media guidance application is implemented. The screen of user equipment 106 may display an interactive media guidance application, which may cause the display of a media asset, e.g., "Bachelor" 108 to the audience, e.g., a group of users 102a-c. Scene 100b includes user equipment 116 which may be similar to 106 in scene 100a, which also may cause the display of a media asset, e.g., the same "Bachelor" show 108, to user 102d.

For example, users 102a-d may usually like to watch the "Bachelor" show as a group together, but user 102d may not be able to watch the episode of the week with the normal group of users 102a-c. As shown in scene 100a, when the group of users 102a-c watch the "Bachelor" show 108, the media guidance application may capture, e.g., via a video camera 110 (or an audio recorder), all the gasps and reactionary utterances from the users 102a-c. For example, a vocal expression from user 102c, "Can you believe he chooses Nina?!" at 112b, and a vocal expression from user 102a of "Unbelievable" 112a may be captured by the video or audio recorder 110. At scene 100b, when user 102d watches the same "Bachelor" episode 108, which may be at the same time when the episode is aired but at a different location from the users 102a-c, or at a later time than the time when users 102a-c watches the episode 108, captured and stored reactions such as vocal expressions 112a-b are retrieved and presented to the user 102d, e.g., as part of audio annotations 113a-b at the corresponding playback positions during the episode 108 when the original vocal expressions 112a-b were captured.

Specifically, the media guidance application may capture, via audio capturing circuitry, when the media asset is being played at a first playback position, an audio recording of ambient sound from an environment at which users 102a-c are present. For example, the media guidance application may periodically, intermittently or constantly record ambient background noise of the room where the user is present. In some implementations, an audio or a video capturing device 110, which may be implemented with user equipment 106, may be used to capture the audio recording. In another implementation, a client component of the media guidance application running on a user device 114 may be used to capture the audio recording.

The media guidance application may then determine whether the audio recording of ambient sound includes a vocal expression, e.g., 112a-b, from any of the users 102a-c. For example, the media guidance application may detect whether the recorded ambient noise from the scene 100a contains a human voice corresponding to any of the users 102a-c. The media guidance application may extract a set of mono signals from the audio recording, e.g., by converting a plurality of audio signals from the audio recordings to the frequency domain via Fourier transform, and identifying mono signals among the frequency domain representation. For each mono signal from the set of mono signals, the media guidance application may generate a set of audio characteristics corresponding to the mono signal. For example, the set of audio characteristics includes any of mel-frequency cepstral coefficients (MFCC), perceptual linear prediction relative spectra (PLP-RASTA). For another example, the set of audio characteristics may include the spectrum range, strength, and/or the like. The media guidance application may then retrieve, from the profile of the user (e.g., from storage 608 in FIG. 6), a set of vocal characteristics, which may include the pitch, loudness, MFCC, PLP-RASTA, and/or the like.

The media guidance application may compare each characteristic of the set of audio characteristics with a corresponding characteristic from the set of vocal characteristics of the same type.

For example, the media guidance application determines whether the MFCC of the mono signal and the stored MFCC of the user's voice are within a small range of difference (e.g., 3%, 5%, etc.). If the characteristics of the same kind are within the small rage of difference, the two characteristics are considered to be a match. The media guidance application may then determine whether the set of audio characteristics and the set of vocal characteristics overlap, e.g., match, for more than a similarity threshold (e.g., 65%, 68%, etc.). In response to determining that the set of audio characteristics and the set of vocal characteristics overlap for more than the similarity threshold, the media guidance application may identify the mono signal as a vocal expression from the respective user. For example, as shown in FIG. 1, the media guidance application may capture an audio including a vocal expression 112a having matching audio characteristics with user 102a, and a vocal expression 112b having matching audio characteristics with user 102c.

In response to determining that the audio recording of ambient sound includes the vocal expression from at least one user from the users 102a-c, the media guidance application may determine whether the vocal expression relates to any occurrence from the Bachelor show 108. Specifically, the media guidance application may determine a playback position corresponding to a time when the vocal expression is captured, and then retrieve a segment of the media asset prior to the playback position, e.g., a segment of a pre-defined length (5 seconds, 10 seconds, etc.). The media guidance application may then retrieve metadata corresponding to the segment of the media asset.

In some embodiments, the media guidance application may determine whether the vocal expression is related to an occurrence during the segment of the media asset based on keyword matching between the vocal expression and the metadata corresponding to the segment of the media asset. Specifically, the media guidance application may determine whether the vocal expression includes one or more identifiable keywords. For example, the media guidance application may generate a sequence of syllables from the vocal expression, e.g., "un-be-lie-va-ble" for the vocal expression 112a, and generate a variation pattern from the sequence of syllables. The media guidance application may then calculate a difference metric of the variation pattern indicative of a degree of difference among the sequence of syllables, and determine whether the difference metric is greater than a pre-defined difference threshold. For example, in response to determining that the vocal expression includes one or more identifiable keywords, the media guidance application may identify, via speech recognition analysis, one or more keywords from the vocal expression, such as "unbelievable," "believe," "Nina," "choose(s)" and/or the like. The media guidance application may retrieve metadata corresponding to a segment of the media asset that is immediately before the playback position of the media asset, and compare the retrieved metadata with the one or more keywords. The media guidance application may then determine, based on the comparing, that the vocal expression is related to an occurrence during the segment of the media asset. For example, when the "Bachelor" show 108 shows that the bachelor chooses a contestant named "Nina," the subtitle from the metadata of this segment may include the keyword "Nina," and may have a match with the vocal expression 112b of "can you believe he chooses Nina." The media guidance application may then determine that the vocal expression 112b is related to the segment of the media asset 108.

In some embodiments, the media guidance application may analyze of the content of the media asset 108 to infer whether reactions 112a-b are relevant to the media asset 108. For example, the media guidance application may use content of the media asset and metadata such as the soundtrack, changing color tones of scene in the media asset, different shot placement, quick cuts, zooming, or panning effects that are displayed during the playback of the media asset 108 to determine a sentiment associated with the media asset. For example, if the media guidance application determines changed background music with a stunning sound effect around the playback position when vocal expressions 112a-b are captured, the media guidance application may determine that the keywords "unbelievable," "can," "you," "believe," etc., and the tone of the vocal expressions 112a-b are consistent with the sound effect. The media guidance application may then correlate the vocal expressions 112a-b with the content of the media asset 108.

In some embodiments, the media guidance application may determine whether a vocal expression is related to a segment of the media asset at a playback position by assessing a logical relationship based on a data graph, in addition to keyword matching. For example, the vocal expression 112a of "unbelievable" from user 102a may not have any matching keyword with the subtitle of the media asset, but the vocal expression 112a is caused by the segment of the show when the bachelor chooses a contestant named "Nina." In this case, the media guidance application may utilize a data graph to build the logic relationship between the metadata and the vocal expression. For example, the data graph may include a set of nodes, each representing a term, and each edge connecting two nodes representing a direct relationship between the two terms indicative by the two nodes. The distance between two nodes indicates a degree of closeness between the two terms represented by the two nodes.

Specifically, the media guidance application may identify one or more terms from the retrieved metadata corresponding to the segment of the media asset that is immediately before the first playback position of the media asset. The media guidance application may then retrieve a data graph representing a logic relationship between content terms relating to the media asset. The media guidance application may determine, from the data graph, a first node representing at least one of the one or more keywords from the vocal expression. For example, the media guidance application may locate a first node indicative of the word "unbelievable" from vocal expression 112a on the data graph. The media guidance application may then determine, from the data graph, a second node representing at least one of the identified one or more terms from the retrieved metadata. For example, the media guidance application may identify terms from the subtitle of the "Bachelor" show at the time when user 102a utters "unbelievable" 112a, such as "rose ceremony," "proposal," and/or the like. The media guidance application may then determine, based on the data graph, a connection between the first node and the second node, e.g., a path comprising several edges between the terms "unbelievable" and "proposal" on the graph. In response to determining that the length of the connection between the first node and the second node is shorter than a pre-defined distance, e.g., indicating that the two terms are sufficiently close to form a possible causal relationship, the media guidance application may determine that the vocal expression is related to the at least one term representing an occurrence during the segment of the media asset. For example, the first node indicative of the term "unbelievable" may be connected to the term "proposal" via the path of "unbelievable," "surprise," "event" and "proposal."

In some embodiments, the media guidance application may determine, based on characteristics of the connection between the first node and the second node, a type of a relationship between at least one of the one or more keywords from the vocal expression and at least one of the identified one or more terms from the retrieved metadata. For example, the data graph may specify a relationship represented by an edge, based on which the media guidance application may determine that the term "proposal" and the keyword "unbelievable" may have a causal relationship. For another example, the media guidance application may determine the type of relationship based on a length of the distance between two nodes, e.g., when the distance is shorter than a pre-defined threshold, the two nodes may represent a causal relationship.

In some embodiments, the media guidance application may assign a priority score to a vocal expression depending on a type of relationship between the keyword from the vocal expression and the terms from the media asset. Specifically, in response to determining that the type of the relationship is a causal relationship, the media guidance application may assign a relatively higher priority score to the at least one keyword, e.g., the vocal expression 112a of "unbelievable" may be caused by the segment when the bachelor chooses a contestant "Nina" in the "Bachelor" show 108. For another example, in response to determining that the type of the relationship is a non-causal relationship, the media guidance application may assign a relatively lower priority score to the at least one keyword. For example, a vocal expression of "this episode is so slow," representing a general comment on the media asset, instead of having a causal relationship from a specific segment at the playback position may be assigned with a lower priority score. The media guidance application may transmit, to a server, the vocal expression in connection with an assigned priority score and the playback position of the media asset.

In some embodiments, the media guidance application may exclude user reactions that may not respond to the media asset watching, e.g., when the user is distracted by reading emails, playing video games on the user device 114, etc. For example, the media guidance application may use biometric information, gaze detection or other information to detect a user's reaction and more particularly to determine whether the reaction was in context to the friend's viewing of the show. For example, if the media guidance application detects that user 102c gasped but also determines user 102c was not looking at the screen of user equipment 106, but instead was looking at the user device 114, the media guidance application may filter the reaction out as irrelevant to the viewing experience of media asset 108. On the other hand, if user 102c is looking at the screen or section of the screen of user equipment 106 when a vocal expression 112b was captured, the media guidance application may determine the reaction is relevant. Specifically, the media guidance application may monitor user activity during a time period corresponding to the segment of the media asset, e.g., to determine whether the user is paying attention to the media asset, or is distracted by other activities. The media guidance application may capture, via monitoring circuitry (e.g., a video camera or audio recorder 110, etc.), user physiological data corresponding to the time period when the segment of the media asset is played. For example, the media guidance application may record a video from the scene where the user is present to capture user activities, or an audio recording from the environment to capture ambient noise indicative of user activities.

In some embodiments, the media guidance application may also retrieve user application history corresponding to user device activities during the time period when the segment of the media asset is played. For example, the user application history from the user device 114 may indicate whether the user has been paying attention to the media asset 108. If a video gaming application has been actively engaged around the time when the vocal expression 112a or 112b is captured, the media guidance application may correlate the application usage event to determine what is an actual cause of the vocal expression 112a-b. Specifically, the media guidance application may determine whether the vocal expression is caused by an event associated with the first user from the user physiological data and the user application history. In response to determining that the vocal expression is caused by the event associated with the first user from the user physiological data and the user application history, the media guidance application may refrain from storing the vocal expression 112a or 112b. Further detail on determining whether a user reaction is caused by an event in the media asset being played or other factors by monitoring user activities is discussed in commonly owned and co-pending PCT international application no. PCT/US2018/024749, filed on Mar. 28, 2018, which is hereby expressly incorporated by reference herein by its entirety.

In some embodiments, the media guidance application may also use the collective reactions of a broader population to determine whether vocal expressions 112a or 112b is relevant to the content of the media asset 108. For example, if audience within a geographic region who is watching in real-time, or has watched the same Bachelor show 108, has similar reactions at the same playback position during the show, it is more likely that vocal expression 112a-b are triggered by an event in the show. The media guidance application may obtain a percentage of audience members who reacted in a similar way and determine whether the percentage exceeds a threshold to infer that vocal expressions 112*a-b* were relevant to the content of the media asset 108.

In response to determining that the vocal expression is related to the occurrence during the segment of the media asset, the media guidance application may store the vocal expression in connection with the first playback position of the media asset. As shown at scene 100*b* in FIG. 1, the media guidance application may cause, when the media asset is displayed at a second time later than the first time to a second user, the stored vocal expression to be played back at the first playback position of the media asset. For example, when user 102*d* watches the same Bachelor show 108 at a later time on user equipment 116, e.g., at a different location from users 102*a-c*, the recorded vocal expressions from users 102*a* and 102*c* may be played back to the user 102*d* as audio annotations 113*a* and 113*b* with the media asset 108 at the corresponding playback position. For another example, the stored vocal expressions 113*a-b* may be played at a user device with the user 102*d*. For another example, the stored vocal expressions 113*a-b* may be converted to textual content and be transmitted to the user 102*d* via text, email, and/or the like. In this way, when user 102*d* watches the event from the Bachelor show 108 which triggered the vocal expressions 112*a* and 112*b* from users 102*a* and 102*c*, respectively, the vocal expressions 113*a* and 113*b* may be played back such that the user 102*d* may perceive the reactions from users 102*a* and 102*c* towards the same event in the Bachelor show 108 in synchronization with the playback.

In some embodiments, the captured reaction from a user's friend may be presented to the user as an audio playback through the same audio channel at which the media guidance application displays a media asset 108. In some embodiments, the media guidance application may detect an indoor location and/or position at which the user is sitting, and use directional audio or features of surround sound to make the audio appear to be coming from the seat right next to the user. In some embodiments, the media guidance application may send the vocal expression to a personal device of the user, such that the audio may appear to be generated by the side of the user. In some embodiments, when the personal device includes an augmented reality (AR) device, such as a pair of AR glasses, or other wearable device, the media guidance application may cause the video of the user's friend to be transmitted and displayed to the AR device such that the user may have an immersive experience of watching the media asset with his or her friend.

In some embodiments, prior to playback the recorded vocal expression 113*a* or 113*b* to another user when the media asset 108 is played at a later time to the other user, the media guidance application may determine whether to share the vocal expression 112*a* or 112*b* with another user per privacy setting. Specifically, the media guidance application may receive an indication that the media asset is being played to another user 102*d*. For example, the media guidance application may receive a user request to display media asset 108 at the same user equipment 106 at a later time. For another example, the media guidance application may receive an indication from a server that the media asset 108 is displayer a different user equipment 116, which may or may not be associated with the user equipment 106 under the same user profile. The media guidance application may then query a user database for a user profile corresponding to the other user 102*d*, based on which the media guidance application may determine a connection between users 102*a* or 102*c* and the user 102*d*, e.g., whether the noted users are socially connected. The media guidance application may then retrieve a privacy setting profile corresponding to the first users, e.g., users 102*a* or 102*c*, and determine whether the other user 102*d* is an authorized user to share the vocal expressions 113*a-b* recorded and stored from users 102*a* or 102*c* by comparing the social connection between users 102*a* or 102*c* and the other user 102*d* with the privacy setting profile. For example, the privacy setting profile associated with user 102*c* may specify that only first-degree connections can share vocal expressions recorded from the user 102*c*. Accordingly, if the user 102*d* is not a direct first-degree connection with user 102*c*, vocal expression 113*b* may not be shared with user 102*d*. In response to determining that the other user is the authorized user to share the vocal expression from the first user, the media guidance application may cause, when the media asset is displayed at the second time later than the first time to a second user, the stored vocal expression to be played back at the first playback position of the media asset.

In some embodiments, the media guidance application may locally store the recorded vocal expressions 112*a* or 112*b* for fast retrieval of playback when the media asset 108 is played back on the same user equipment 106 at a later time. Specifically, the media guidance application may receive at the first user equipment (e.g., user equipment 106) at a second time, a request from the second user (e.g., user 102*d*) to playback the media asset 108. The media guidance application may then generate for display, at first user equipment and at the second time, the media asset to the second user, and retrieve, from a local database, the stored vocal expression corresponding to the first playback position when the vocal expression 112*a* or 110*b* is recorded. The media guidance application may then generate for audio playback the stored vocal expression 113*a* or 113*b* at the first playback position of the media asset.

In some embodiments, the media guidance application may share the vocal expression 112*a* or 112*b* with a cloud server such that different users, different devices (e.g., user mobile devices, etc.), different user equipment and/or different media guidance applications implemented at different set-top boxes at different households may retrieve and playback the stored vocal expressions. For example, the media guidance application may also query for vocal expressions recorded at other user equipment when displaying the media asset 108. Specifically, in response to generating for display, at first user equipment and at the second time, the media asset to the second user, the media guidance application may transmit, to a server, a query including a media asset title of the media asset for vocal expressions relating to the media asset from other users. In response to the query, the media guidance application may receive, from the server, a plurality of vocal expressions relating to the media asset, and each vocal expression corresponds to a respective user identifier and a respective playback position when the respective vocal expression was recorded.

For example, FIG. 2 shows an example block diagram illustrating sharing recorded vocal expressions captured from a user, within embodiments described herein. In some embodiments, the user 102*c*, after watching the media asset 108, may elect to share recorded watching experience, e.g., in the form of stored audio (or video) files of the vocal expressions 112*b*. For example, the media guidance application may prompt a menu option 117 for the user 102*c* to select to "share your experience" by searching the name of a contact of user 102*c*. Upon the user 102*c* entering the name of the contact, e.g., the name of user 102*d*, user 102*d* may receive a notification, e.g., via email, text message, etc., notifying that viewing experience from user 102c is available.

In some embodiments, the media guidance application may filter vocal expressions that are stored with the media asset and only play a subset of more relevant vocal expressions to avoid adding too many audio annotations to the media asset playback. For example, as described above, a cloud server may collect vocal expressions from different users, which are recorded when the different users are watching the media asset 108, e.g., an episode of the Bachelor show. At certain playback position of the media asset 108, e.g., after a key event such as a rose ceremony in the show, a large number of vocal expressions or user reactions in other forms may be collected. The media guidance application may selectively playback a subset of the available vocal expressions to avoid the audio playback of the vocal expressions is overly crowded (e.g., vocal expressions that are too close in time, etc.) and disrupts the user viewing experience. Specifically, the media guidance application may retrieve a first vocal expression corresponding to the first playback position and retrieving a second vocal expression corresponding to the second playback position, and determine whether an amount of time between the first playback position and the second playback position is smaller than a threshold, e.g., five seconds, etc. In response to determining that the amount of time between the first playback position and the second playback position is smaller than the threshold, the media guidance application may select one of the first vocal expression and the second vocal expression that has a higher priority score. In another example, the media guidance application may determine whether the number of vocal expressions associated with a segment around a playback position is greater than a threshold (e.g., five, seven, etc.), and may then selectively choose only a subset of the number of vocal expressions for audio playback. For example, the media guidance application may selectively choose a subset of available vocal expressions for playback with the media asset based on a social relationship between each respective user who generated the respective vocal expression and the user who is watching the media asset, based on a popularity or a rating of a respective user who generates the respective vocal expression (e.g., vocal expressions may be rated upon user experience), and/or the like.

In some embodiments, the media guidance application may provide a recommendation or a notification to another user when vocal expressions recorded from a first user are available to create co-watching experience. For example, FIG. 3 provides an example block diagram illustrating recommending viewing experience from other users when a user selects to play back a media asset, within embodiments described herein. The media guidance application may determine whose vocal expressions the user may be interested in while watching the Bachelor show, e.g., a social influencer (e.g., Tyra Banks) that the user has followed on social media, and generate a recommendation to "watch the Bachelor with Tyra Banks" 118 to the user. Specifically, in response to storing the vocal expression in connection with the first playback position of the media asset, the media guidance application may identify a third user to whom the first user is an influencer based on social profiles of the first user and the third user, e.g., when the third user has followed the first user as a "fan" of the first user on social media. The media guidance application may cause a notification indicating a title of the media asset and information relating to the vocal expression from the first user to be transmitted to the third user. For example, the user may receive a notification (e.g., on user mobile device) recommending the user, or an option item 118 on an information page of the Bachelor show 108 displayed on user equipment 116 to "watch the Bachelor with Tyra Banks." In some implementations, upon the user selecting the option "watch the Bachelor with Tyra Banks" 118, the media guidance application may prompt a payment option for the user to pay a fee to download vocal expression recorded from "Tyra Banks" in order to create a co-viewing experience with the celebrity. In some implementations, the downloadable vocal expression from "Tyra Banks" may be reviewed and filtered (e.g., to remove sensitive or inappropriate vocal content) to generate the commercially available and downloadable audio add-on. For another example, when the user selects to watch the Bachelor show 108, the user may select the option "see who watched this episode of the Bachelor" 119 and see a list of people whose vocal expressions are available for playback with the show, or by entering a person's name whose viewing experience the user is interested in to search for available vocal expression. In response to the notification being sent to the third user, the media guidance application may receive a request to download the vocal expression and then cause an audio file containing the first vocal expression and the first playback position to be sent to the third user.

FIGS. 4-5 show illustrative display screens that may be used to provide media guidance data. The display screens shown in FIGS. 4-5 may be implemented on any suitable user equipment device or platform, e.g., user equipment 106 or the set-top box 120 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 49, 4001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
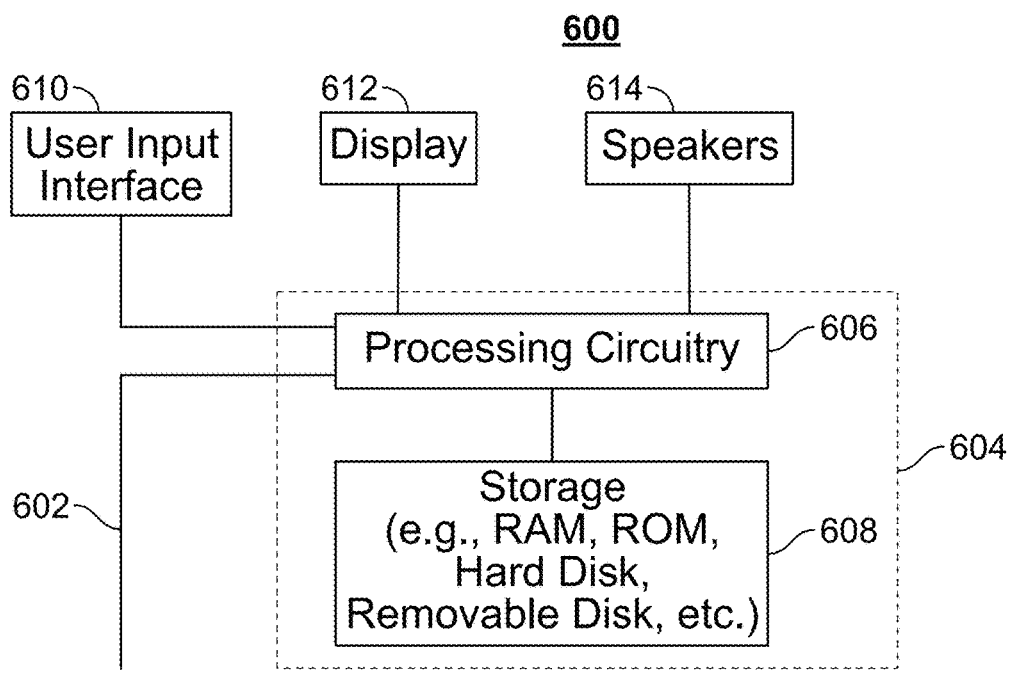
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 of FIG. 6 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

Figure 7:
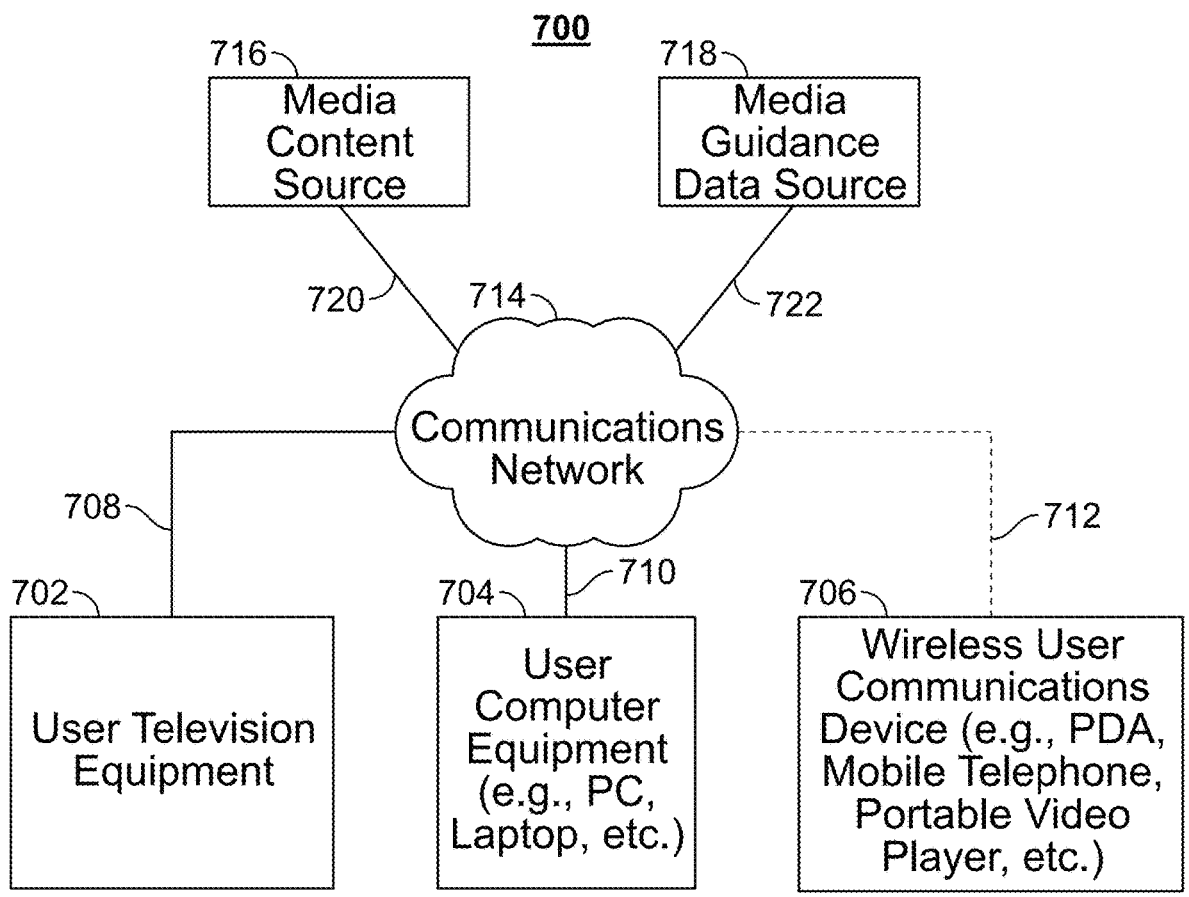
FIG. 7 is a block diagram of an illustrative media system in accordance with some embodiments of the disclosure.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 604 of a user equipment device 400. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
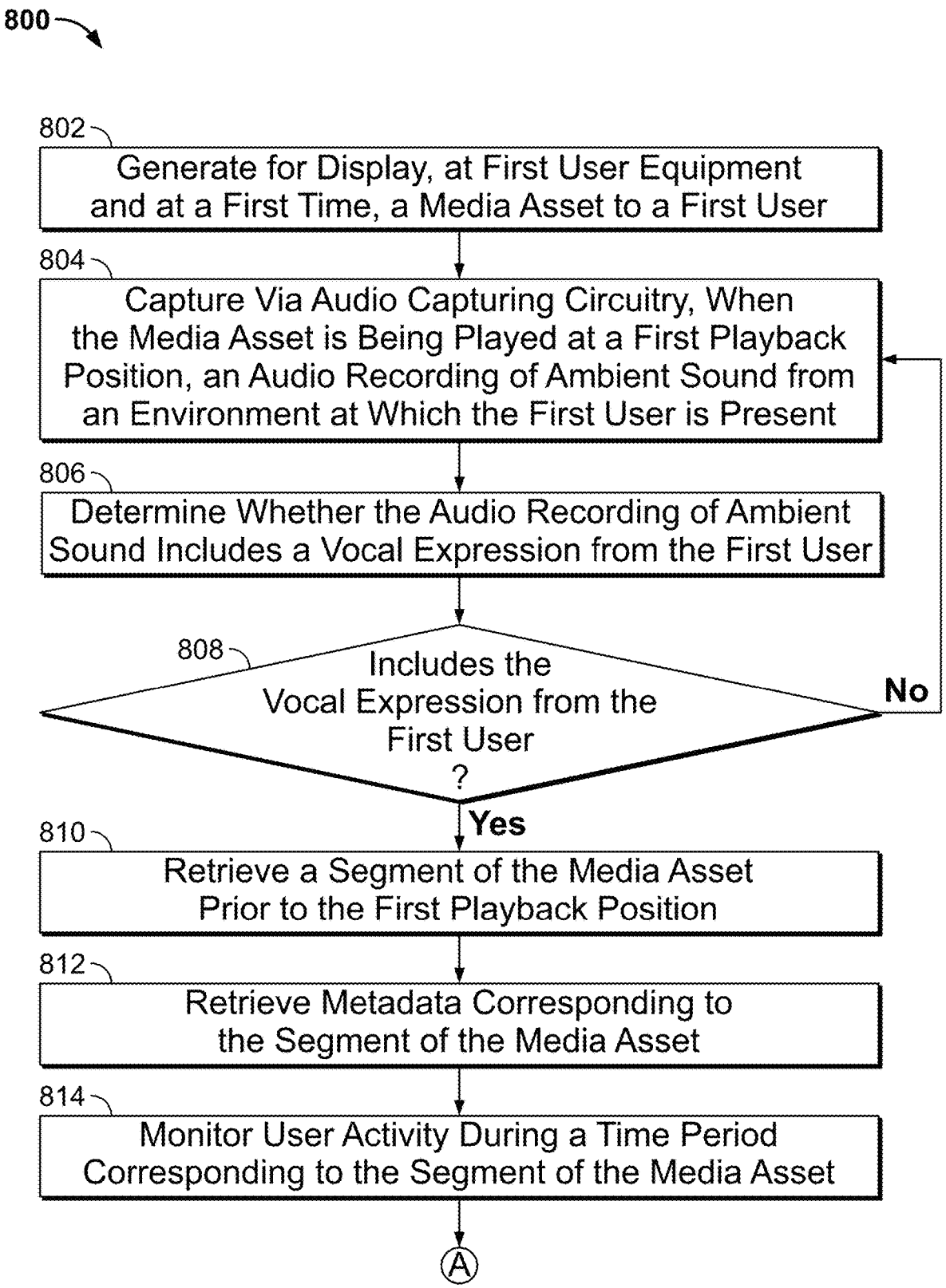
FIG. 8 depicts an illustrative flowchart of a process for storing a user vocal comment relating to a media asset for augmenting playback of the media asset to another user to create a social viewing experience of the media asset, in accordance with some embodiments of the disclosure.
Figure 8:
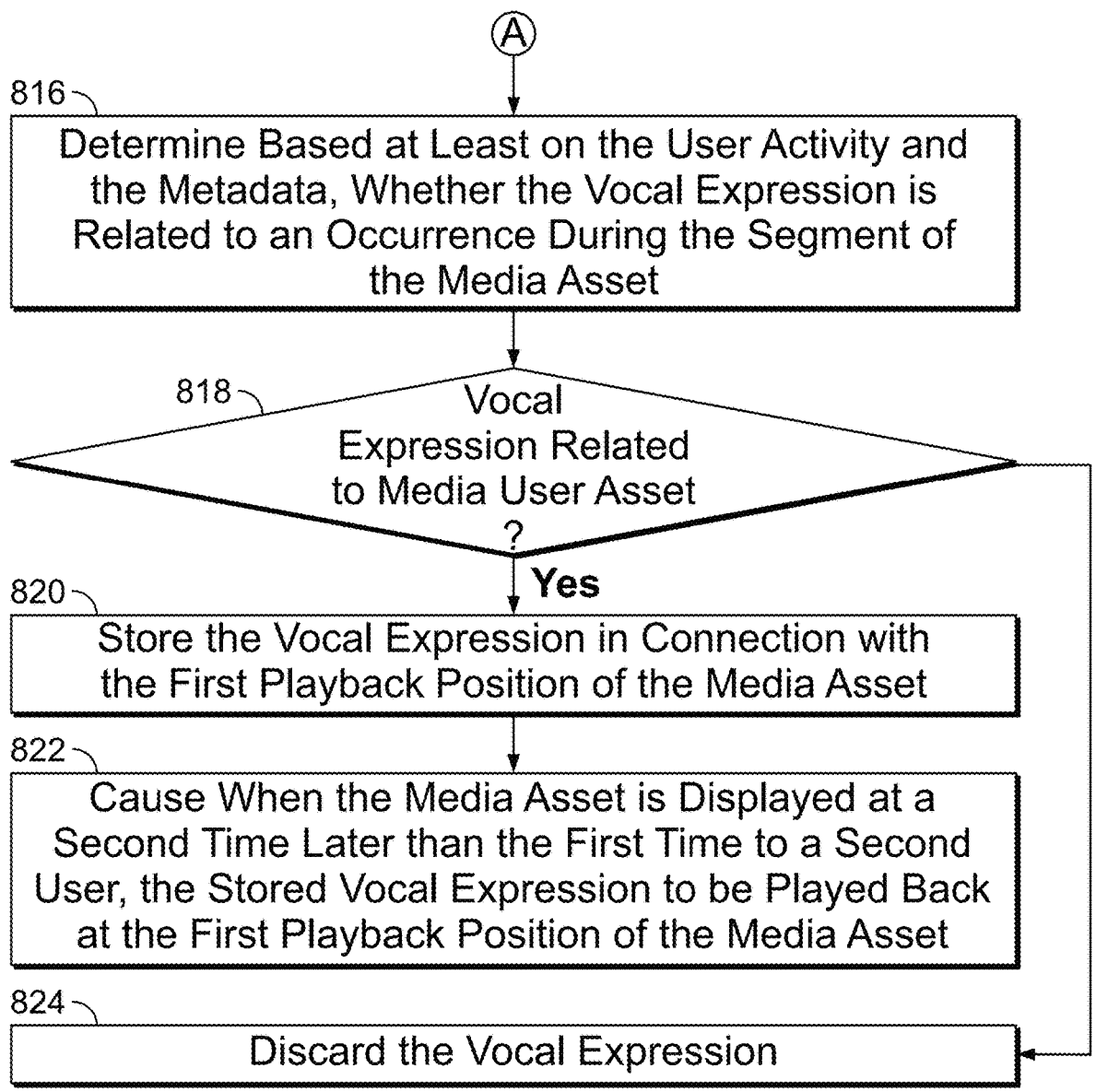

FIG. 8 depicts an illustrative flowchart of a process for storing a user vocal comment relating to a media asset for augmenting playback of the media asset to another user to create a social viewing experience of the media asset, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, which may have the functionality of any or all of user television equipment 702, user computer equipment 704, and/or wireless communications device 706), or of a remote server separated from the user equipment by way of communications network 714.

Process 800 begins at 802, where control circuitry 604 generates for display, e.g., via the display circuitry 612 in FIG. 6, at first user equipment and at a first time, a media asset to a first user. At 804, control circuitry 604 captures, via audio capturing circuitry (e.g., via I/O path 604 I FIG. 6), when the media asset is being played at a first playback position, an audio recording of ambient sound from an environment at which the first user is present. For example, control circuitry 604 engages a video camera or an audio recorder 110 in FIG. 1 to record via I/O path 602 in FIG. 6, sound from the environment. At 806, control circuitry 604 determines whether the audio recording of ambient sound includes a vocal expression from the first user. For example, control circuitry 604 analyzes audio characteristics of the audio recording and compares the audio characteristics with user vocal characteristics retrieved from a user profile, e.g., from storage 608 in FIG. 6 or data source 718 in FIG. 7.

At 808, in response to determining that the audio recording of ambient sound includes a vocal expression from the first user, process 800 proceeds to 810. Otherwise, in response to determining that the audio recording of ambient sound does not include a vocal expression from the first user, process 800 goes back to 804 to continue monitoring ambient noise from the environment. At 810, control circuitry 604 retrieves a segment of the media asset prior to the first playback position. For example, when the media asset is live streaming from a channel, control circuitry 604 buffers and then retrieves the buffered segment from storage 608 in FIG. 6. For another example, when the media asset is a previously stored asset, control circuitry 604 retrieves the segment from storage 608 in FIG. 6 (e.g., the local storage of a set-top box), or data source 716 in FIG. 7 (e.g., network storage, etc.). At 812, control circuitry 604 retrieves metadata corresponding to the segment of the media asset, e.g., from storage 608 in FIG. 6 or data source 718 in FIG. 7. At 814, control circuitry 604 monitors user activity during a time period corresponding to the segment of the media asset. For example, control circuitry 604 engages a video camera or an audio recorder 110 in FIG. 1 to record via I/O path 602 in FIG. 6, video or audio from the environment where the first user is present. At 816, control circuitry 604 determines, based at least on the user activity and the metadata, whether the vocal expression is related to an occurrence during the segment of the media asset, as further described in an embodiment in FIG. 10.

At 818, in response to determining that the vocal expression is related to an occurrence during the segment of the media asset, process 800 proceeds to 820, where control circuitry 604 stores the vocal expression in connection with the first playback position of the media asset, e.g., at storage 608 in FIG. 6 or data source 718 in FIG. 7. At 822, control circuitry 604 causes, when the media asset is displayed at a second time later than the first time to a second user, the stored vocal expression to be played back at the first playback position of the media asset. At 818, in response to determining that the vocal expression is related to an occurrence during the segment of the media asset, process 800 proceeds to 824, wherein control circuitry 604 discards the vocal expression.

Figure 9:
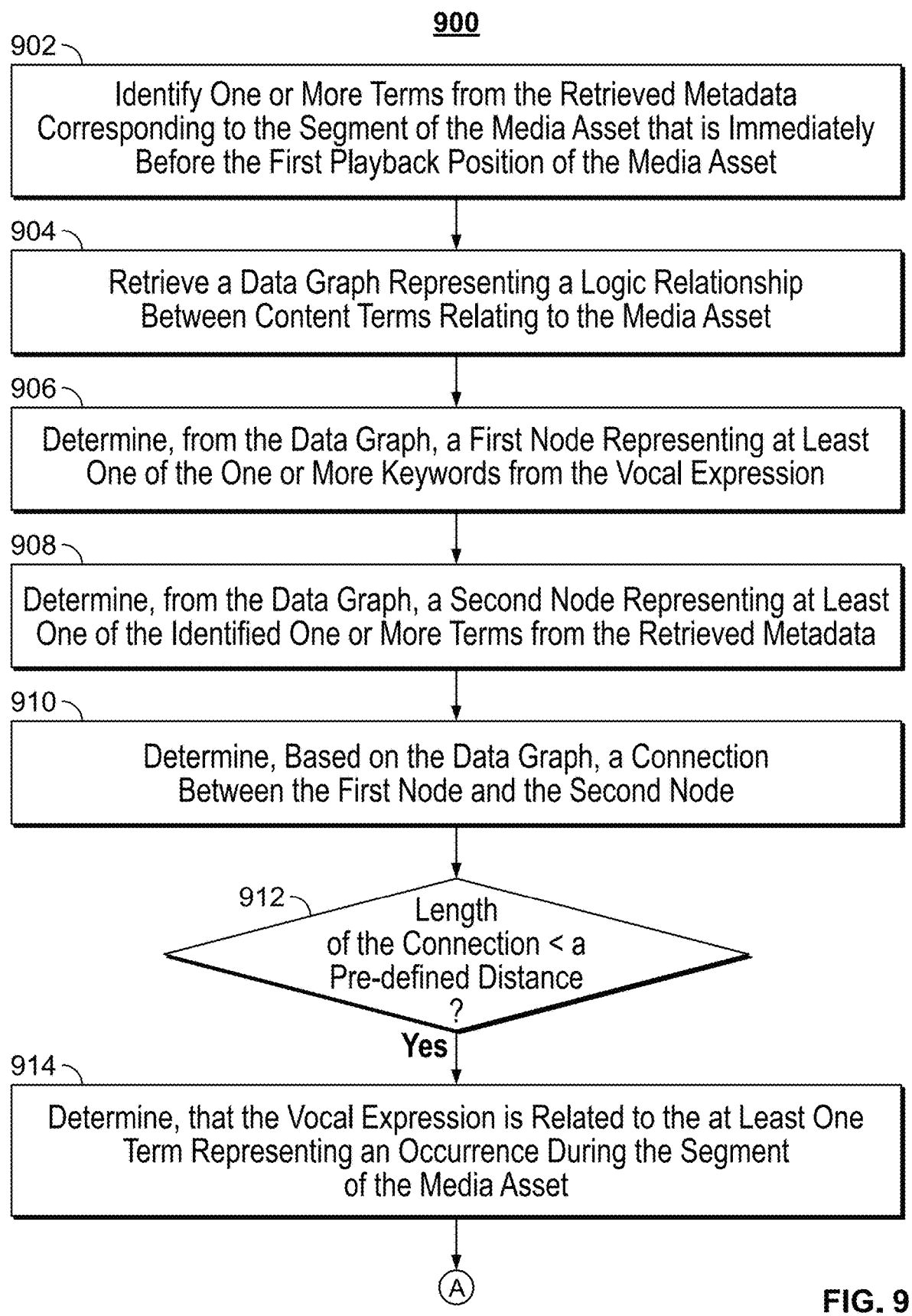
FIG. 9 depicts an illustrative flowchart of a process for determining, based at least on the user activity and the metadata, whether the vocal expression is related to the occurrence during the segment of the media asset, in accordance with some embodiments of the disclosure.
Figure 9:
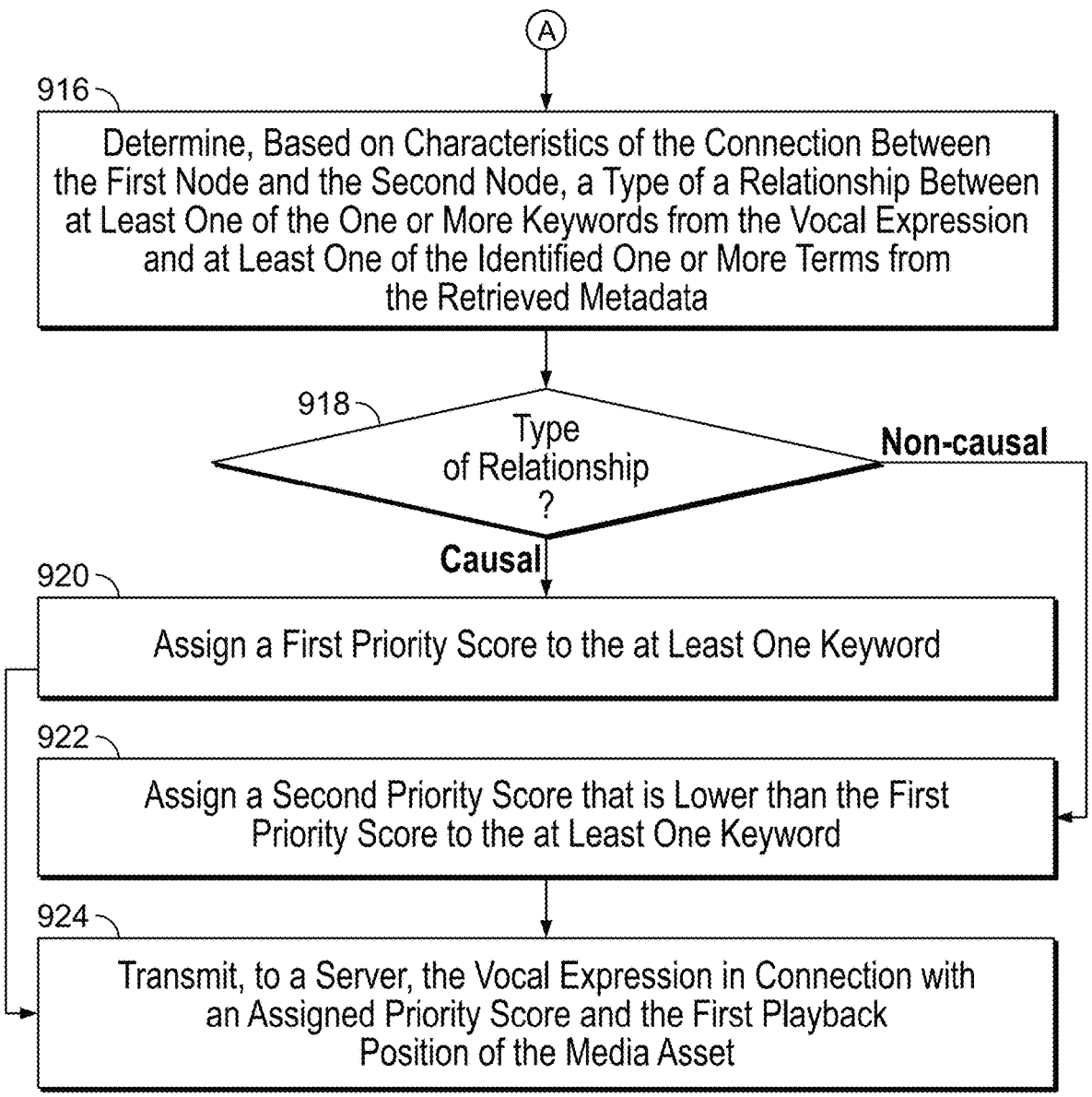

FIG. 9 depicts an illustrative flowchart of a process for determining, based at least on the user activity and the metadata, whether the vocal expression is related to the occurrence during the segment of the media asset (e.g., see 816 in FIG. 8), in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 identifies one or more terms from the retrieved metadata corresponding to the segment of the media asset that is immediately before the first playback position of the media asset. At 904, control circuitry 604 retrieves a data graph representing a logic relationship between content terms relating to the media asset. For example, control circuitry 604 retrieves the data graph from data source 718 in FIG. 7, which includes a data structure having a plurality of nodes and edges. Each node represents a natural language term, and each edge connecting two nodes represents a relationship between the two natural language terms. At 906, control circuitry 604 determines, from the data graph, a first node representing at least one of the one or more keywords from the vocal expression. At 908, control circuitry 604 determines, from the data graph, a second node representing at least one of the identified one or more terms from the retrieved metadata. For example, control circuitry 604 transmits a query based on the one or more keyword or the terms to the data source 718 in FIG. 7 via communications network 714, and receives a pointer or parameters identifying a position of the first or the second node. At 910, control circuitry 604 determines, based on the data graph, a connection between the first node and the second node. For example, control circuitry 604 receives, from the data graph stored at data source 718 in FIG. 7, information relating to a number of edges and intermediate nodes that the connection traverses on the data graph.

At 912, in response to determining that the length of the connection is smaller than a pre-defined distance, process 900 proceeds to 914, where control circuitry 604 determines that the vocal expression is related to the at least one term representing an occurrence during the segment of the media asset. At 916, control circuitry 604 determines, based on characteristics of the connection between the first node and the second node, a type of a relationship between at least one of the one or more keywords from the vocal expression and at least one of the identified one or more terms from the retrieved metadata. For example, control circuitry 604 receives information relating to each edge that constitutes the connection, and the information identifies whether the respective edge represents a causal logic.

At 918, in response to determining that the type of relationship is a causal relationship, process 900 proceeds to 920, where control circuitry 604 assigns a first priority score to the at least one keyword. At 918, in response to determining that the type of relationship is a causal relationship, process 900 proceeds to 922, where control circuitry 604 assigns a second priority score that is lower than the first priority score to the at least one keyword. At 924, control circuitry 604 transmits, to a server (e.g., data source 718 in FIG. 7 for storage), the vocal expression in connection with an assigned priority score and the first playback position of the media asset.

Figure 10:
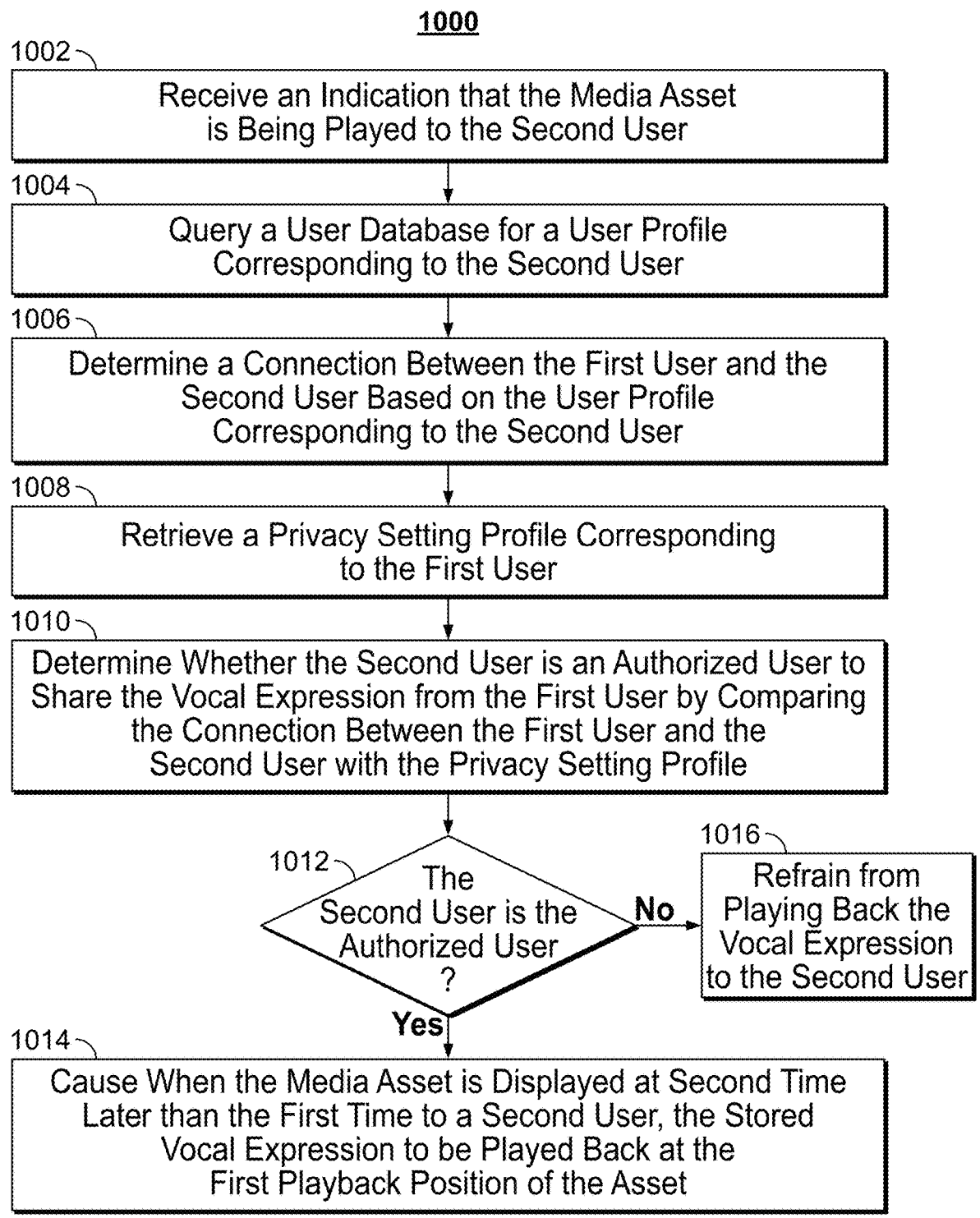
FIG. 10 depicts an illustrative flowchart of a process for determining whether to share the vocal expression with another user based on privacy settings prior to causing, when the media asset is displayed at a second time later than the first time to a second user, the stored vocal expression to be played back at the first playback position of the media asset, in accordance with some embodiments of the disclosure.

FIG. 10 depicts an illustrative flowchart of a process for determining whether to share the vocal expression with another user based on privacy settings prior to causing, when the media asset is displayed at a second time later than the first time to a second user, the stored vocal expression to be played back at the first playback position of the media asset (e.g., see 822 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 receives an indication that the media asset is being played to the second user. For example, as shown and discussed in relation to in FIG. 1, when the media asset 108 is played at a different user equipment at a later time, control circuitry 604 receives an indication, e.g., via communications network 714 in FIG. 7, that the media asset is being played at a different household or a different device. At 1004, control circuitry 604 queries a user database, e.g., at data source 718 in FIG. 7 or storage 608 in FIG. 6, for a user profile corresponding to the second user. At 1006, control circuitry 604 determines a social connection between the first user and the second user based on the user profile corresponding to the second user. For example, control circuitry 604 parses the user social profile of the first user and the second user to determine whether the first user is an influencer, a follower, a direct friend, or any other relationship with the second user. At 1008, control circuitry 604 retrieves a privacy setting profile corresponding to the first user. At 1010, control circuitry 604 determines whether the second user is an authorized user to share the vocal expression from the first user by comparing the connection between the first user and the second user with the privacy setting profile.

At 1012, in response to determining that the second user is an authorized user to share the vocal expression, process 1000 proceeds to 1014, where control circuitry 604 causes, when the media asset is displayed at the second time later than the first time to a second user, the stored vocal expression to be played back at the first playback position of the media asset. For example, as discussed in relation to FIG. 1, control circuitry 604 generates for playback the audio file corresponding to the vocal expression, or sends the audio file via I/O path 602 in FIG. 6 for display at an audio device, e.g., an AR device, a user mobile device, and/or the like. At 1012, in response to determining that the second user is an authorized user to share the vocal expression, process 1000 proceeds to 1016, where control circuitry 604 refrains from playing back the vocal expression.

Figure 11:
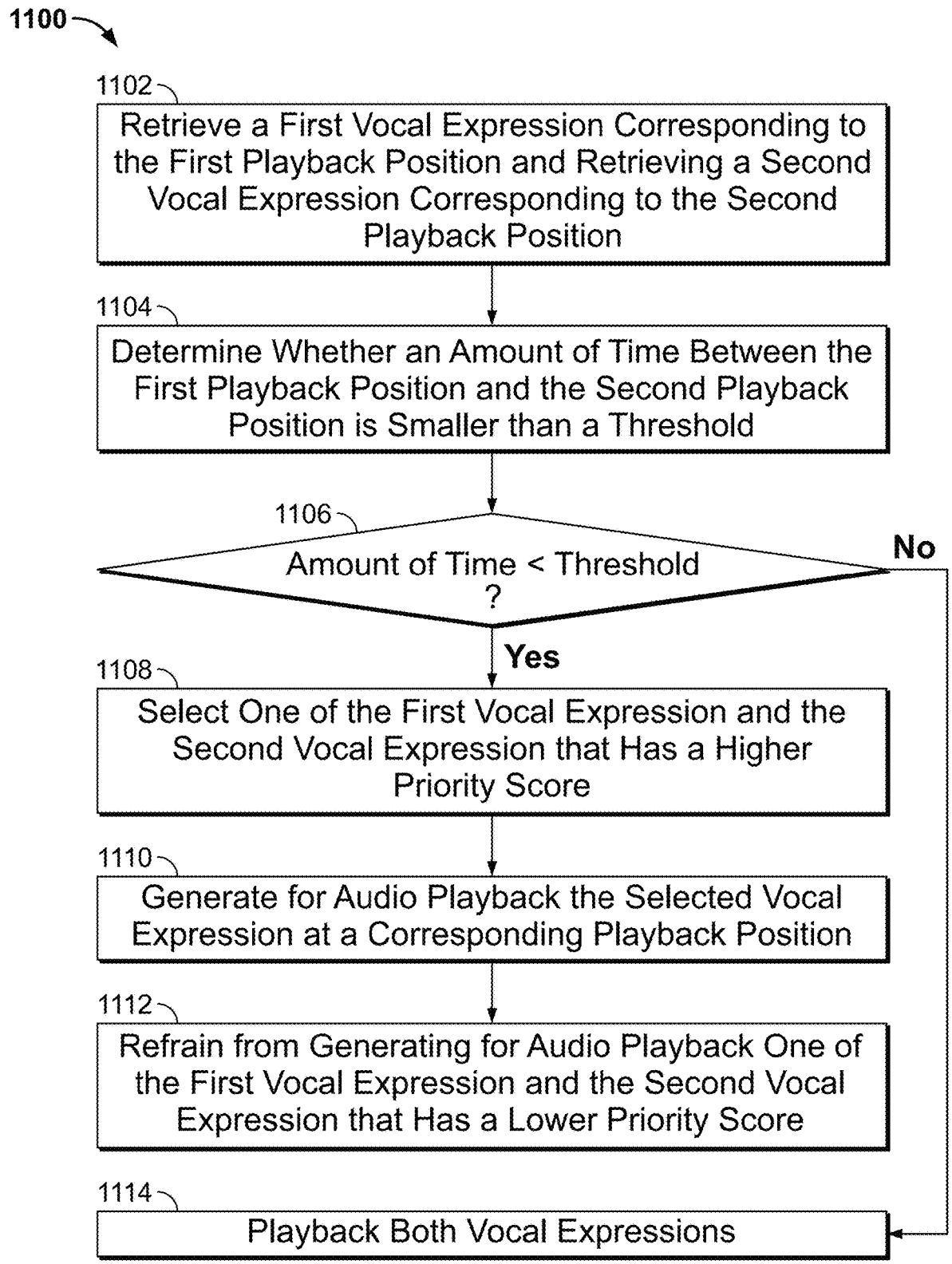
FIG. 11 depicts an illustrative flowchart of a process for filtering vocal expressions stored with a media asset when causing, when the media asset is displayed at a second time later than the first time to a second user, the stored vocal expression to be played back at the first playback position of the media asset, in accordance with some embodiments of the disclosure.

FIG. 11 depicts an illustrative flowchart of a process for filtering vocal expressions stored with a media asset when causing, when the media asset is displayed at a second time later than the first time to a second user, the stored vocal expression to be played back at the first playback position of the media asset (e.g., see 822 in FIG. 8), in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 retrieves a first vocal expression corresponding to the first playback position and retrieving a second vocal expression corresponding to the second playback position, e.g., from storage 608 in FIG. 6 or data source 718 in FIG. 7. At 1104, control circuitry 604 determines whether an amount of time between the first playback position and the second playback position is smaller than a threshold. At 1106, in response to determining that the amount of time is less than a threshold, process 1100 proceeds to 1108, where control circuitry 604 selects one of the first vocal expression and the second vocal expression that has a higher priority score, and generates for audio playback the selected vocal expression at a corresponding playback position at 1110. At 1106, in response to determining that the amount of time is not less than a threshold, process 1100 proceeds to 1112, where control circuitry 604, wherein control circuitry 604 refrains from generating for audio playback one of the first vocal expression and the second vocal expression that has a lower priority score.

It should be noted that processes 800-1100 or any step thereof could be performed on, or provided by, any of the devices shown in, or described with respect to, FIGS. 1-3 and 6-7. For example, any of processes 800-1100 may be executed by control circuitry 604 (FIG. 6) as instructed by control circuitry implemented on user equipment 106 (FIG. 1), 702, 704, 706 (FIG. 6), and/or the like for generating and displaying a summary view of a media asset. In addition, one or more steps of processes 800-1100 may be incorporated into or combined with one or more steps of any other process or embodiment.

It is contemplated that the actions or descriptions of each of FIGS. 8-11 may be used with any other embodiment of this disclosure. In addition, the actions and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-11 could be used to perform one or more of the actions in FIGS. 8-11.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining whether a vocal expression is related to an occurrent in the media asset (see 816 in FIG. 8), e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for supplementing a segment of a media asset with a vocal expression captured during a previous output of the segment, the method comprising:
   capturing user physiological data during a first output of a media asset segment;
   capturing an audio clip during the first output;
   parsing the audio clip to a vocal expression;
   determining, based on the user physiological data, whether the vocal expression is not caused by an event unrelated to the media asset segment;
   in response to determining that the vocal expression is not caused by an event unrelated to the media asset segment, storing the vocal expression in connection with the media asset segment;
   detecting a second output of the media asset segment; and
   outputting the stored vocal expression during the second output.

2. The method of claim 1, further comprising:
   in response to determining that the vocal expression is caused by an event unrelated to the media asset segment, not storing the vocal expression in connection with the media asset segment.

3. The method of claim 1, wherein parsing the audio clip to the vocal expression comprises:
   extracting a set of mono audio signals from the audio clip;
   for each mono audio signal from the set of mono audio signals:
   generating a set of audio characteristics corresponding to the mono audio signal;
   retrieving a set of vocal characteristics from a user profile;
   comparing each characteristic of the set of audio characteristics with a corresponding characteristic from the set of vocal characteristics that has a same type;
   determining whether the set of audio characteristics and the set of vocal characteristics overlap for more than a similarity threshold;
   in response to determining that the set of audio characteristics and the set of vocal characteristics overlap for more than the similarity threshold, identifying the respective mono audio signal as corresponding to the vocal expression.

4. The method of claim 1, wherein determining, based on the user physiological data, whether the vocal expression is caused by the event unrelated to the media asset segment comprises:
   identifying, via speech recognition analysis, one or more keywords from the vocal expression;
   retrieving metadata corresponding to the media asset segment;
   comparing the retrieved metadata with the one or more keywords;
   determining, based on the comparing, that the vocal expression is not caused by the event.

5. The method of claim 4, wherein comparing the retrieved metadata with the one or more keywords further comprises:
   identifying one or more terms from the retrieved metadata corresponding to the media asset segment;
   retrieving a data graph representing a logic relationship between content terms relating to a media asset comprising the media asset segment;
   determining, from the data graph, a first node representing at least one of the one or more keywords from the vocal expression;
   determining, from the data graph, a second node representing at least one of the identified one or more terms from the retrieved metadata;
   determining, based on the data graph, a connection between the first node and the second node;
   in response to determining that a length of the connection between the first node and the second node is shorter than a pre-defined distance, determining that the vocal expression is related to the at least one term representing an occurrence during the segment of the media asset;
   determining, based on characteristics of the connection between the first node and the second node, a type of a relationship between at least one of the one or more keywords from the vocal expression and at least one of the identified one or more terms from the retrieved metadata;
   in response to determining that the type of the relationship is a causal relationship, assigning a first priority score to the at least one keyword;
   in response to determining that the type of the relationship is a non-causal relationship, assigning a second priority score that is lower than the first priority score to the at least one keyword; and
   transmitting, to a server, the vocal expression in connection with an assigned priority score.

6. The method of claim 1, wherein capturing the audio clip occurs at an end point of the media asset segment during the first output and wherein outputting the stored vocal expression occurs at the end point of the media asset segment during the second output.

7. The method of claim 6, wherein the vocal expression is of a first user, and wherein outputting the stored vocal expression at the end point of the media asset segment during the second output comprises:
   receiving an indication that the media asset segment is being output to a second user during the second output;
   querying a user database for a user profile corresponding to the second user;
   determining a connection between the first user and the second user based on the user profile corresponding to the second user;
   retrieving a privacy setting profile corresponding to the first user;
   determining whether the second user is an authorized user to share the vocal expression from the first user by comparing the connection between the first user and the second user with the privacy setting profile;
   in response to determining that the second user is the authorized user to share the vocal expression from the first user, outputting the stored vocal expression at the end point of the media asset segment during the second output.

8. The method of claim 6, wherein outputting the stored vocal expression at the end point of the media asset segment during the second output comprises:
   receiving a request to output the media asset segment at user equipment;
   generating, for display on the user equipment, the media asset segment;
   retrieving, from a local database, the stored vocal expression; and
   generating for audio playback the stored vocal expression at the end point of the media asset segment.

9. The method of claim 1, further comprising:
transmitting, to a server, a query for vocal expressions from other users, wherein the vocal expressions relate to a media asset comprising the media asset segment;
in response to the query, receiving, from the server, a plurality of vocal expressions relating to the media asset, each vocal expression corresponding to a respective user identifier and a respective playback position when the respective vocal expression was recorded;
determining a subset of the plurality of vocal expressions based on a social relationship between each respective user and a first user associated with the first output; and
generating for audio playback the subset of the plurality of vocal expressions at each respective playback position of the media asset.

10. A system for supplementing a segment of a media asset with a vocal expression captured during a previous output of the segment, the system comprising:
control circuitry configured to:
capture user physiological data during a first output of a media asset segment;
capture an audio clip during the first output;
parse the audio clip to a vocal expression;
determine, based on the user physiological data, whether the vocal expression is not caused by an event unrelated to the media asset segment;
in response to determining that the vocal expression is not caused by an event unrelated to the media asset segment, store the vocal expression in connection with the media asset segment;
detect a second output of the media asset segment; and
output the stored vocal expression during the second output.

11. The system of claim 10, wherein the control circuitry is further configured to:
in response to determining that the vocal expression is caused by an event unrelated to the media asset segment, not store the vocal expression in connection with the media asset segment.

12. The system of claim 10, wherein the control circuitry is further configured to parse the audio clip to the vocal expression by:
extracting a set of mono audio signals from the audio clip;
for each mono audio signal from the set of mono audio signals:
generating a set of audio characteristics corresponding to the mono audio signal;
retrieving a set of vocal characteristics from a user profile;
comparing each characteristic of the set of audio characteristics with a corresponding characteristic from the set of vocal characteristics that has a same type;
determining whether the set of audio characteristics and the set of vocal characteristics overlap for more than a similarity threshold;
in response to determining that the set of audio characteristics and the set of vocal characteristics overlap for more than the similarity threshold, identifying the respective mono audio signal as corresponding to the vocal expression.

13. The system of claim 10, wherein the control circuitry is further configured to determine, based on the user physiological data, whether the vocal expression is caused by the event unrelated to the media asset segment by:
identify, via speech recognition analysis, one or more keywords from the vocal expression;
retrieve metadata corresponding to the media asset segment;
compare the retrieved metadata with the one or more keywords;
determine, based on the comparing, that the vocal expression is not caused by the event.

14. The system of claim 13, wherein the control circuitry is further configured to compare the retrieved metadata with the one or more keywords by:
identifying one or more terms from the retrieved metadata corresponding to the media asset segment;
retrieving a data graph representing a logic relationship between content terms relating to a media asset comprising the media asset segment;
determining, from the data graph, a first node representing at least one of the one or more keywords from the vocal expression;
determining, from the data graph, a second node representing at least one of the identified one or more terms from the retrieved metadata;
determining, based on the data graph, a connection between the first node and the second node;
in response to determining that a length of the connection between the first node and the second node is shorter than a pre-defined distance, determining that the vocal expression is related to the at least one term representing an occurrence during the segment of the media asset;
determining, based on characteristics of the connection between the first node and the second node, a type of a relationship between at least one of the one or more keywords from the vocal expression and at least one of the identified one or more terms from the retrieved metadata;
in response to determining that the type of the relationship is a causal relationship, assigning a first priority score to the at least one keyword;
in response to determining that the type of the relationship is a non-causal relationship, assigning a second priority score that is lower than the first priority score to the at least one keyword; and
transmitting, to a server, the vocal expression in connection with an assigned priority score.

15. The system of claim 10, wherein the control circuitry is further configured to capture the audio clip at an end point of the media asset segment during the first output and wherein the control circuitry is further configured to output the stored vocal expression at the end point of the media asset segment during the second output.

16. The system of claim 15, wherein the vocal expression is of a first user, and wherein the control circuitry is further configured to output the stored vocal expression at the end point of the media asset segment during the second output by:
receiving an indication that the media asset segment is being output to a second user during the second output;
querying a user database for a user profile corresponding to the second user;
determining a connection between the first user and the second user based on the user profile corresponding to the second user;
retrieving a privacy setting profile corresponding to the first user;
determining whether the second user is an authorized user to share the vocal expression from the first user by comparing the connection between the first user and the second user with the privacy setting profile;
in response to determining that the second user is the authorized user to share the vocal expression from the first user, outputting the stored vocal expression at the end point of the media asset segment during the second output.

17. The system of claim 15, wherein the control circuitry is further configured to output the stored vocal expression at the end point of the media asset segment during the second output by:

receiving a request to output the media asset segment at user equipment;

generating, for display on the user equipment, the media asset segment;

retrieving, from a local database, the stored vocal expression; and generating for audio playback the stored vocal expression at the end point of the media asset segment.

18. The system of claim 10, wherein the control circuitry is further configured to:

transmit, to a server, a query for vocal expressions from other users, wherein the vocal expressions relate to a media asset comprising the media asset segment;

in response to the query, receive, from the server, a plurality of vocal expressions relating to the media asset, each vocal expression corresponding to a respective user identifier and a respective playback position when the respective vocal expression was recorded;

determine a subset of the plurality of vocal expressions based on a social relationship between each respective user and a first user associated with the first output; and generate for audio playback the subset of the plurality of vocal expressions at each respective playback position of the media asset.

* * * * *